United States Patent
Hartmann

(10) Patent No.: US 6,495,046 B1
(45) Date of Patent: Dec. 17, 2002

(54) FILTRATION APPARATUS AND METHODS

(75) Inventor: Eduard Hartmann, Schneisingen (CH)

(73) Assignee: Bucher-Guyer AG, Niederweningen (CH)

( * ) Notice: Subject to any disclaimer, the term of this patent is extended or adjusted under 35 U.S.C. 154(b) by 0 days.

(21) Appl. No.: 09/486,941

(22) PCT Filed: Jul. 2, 1999

(86) PCT No.: PCT/CH99/00294

§ 371 (c)(1),
(2), (4) Date: Mar. 3, 2000

(87) PCT Pub. No.: WO00/03794

PCT Pub. Date: Jan. 27, 2000

(30) Foreign Application Priority Data

Jul. 13, 1998 (CH) ............................................. 1493/98

(51) Int. Cl.$^7$ ............................................. B01D 65/08
(52) U.S. Cl. ................... 210/636; 210/137; 210/195.2; 210/321.65; 210/321.89; 210/456; 210/650; 210/805; 210/637
(58) Field of Search ............................ 210/87, 90, 97, 210/109, 134, 137, 138, 139, 194, 195.2, 257.2, 636, 637, 650, 651, 790, 805, 434, 456; 366/136, 137, 336, 337, 321.8, 321.88, 321.89

(56) References Cited

U.S. PATENT DOCUMENTS

| | | | |
|---|---|---|---|
| 3,770,249 A | * 11/1973 | Schmitt | 366/337 |
| 4,481,130 A | 11/1984 | Robertson | 252/328 |
| 4,670,150 A | * 6/1987 | Hsuing et al. | 210/637 |
| 5,066,402 A | 11/1991 | Anselme et al. | 210/636 |
| 5,112,489 A | * 5/1992 | Hartmann | 210/637 |
| 5,230,804 A | 7/1993 | Leupold et al. | 210/651 |
| 5,310,113 A | 5/1994 | Cowgur | 239/10 |
| 5,466,063 A | 11/1995 | Poyet et al. | 366/6 |
| 5,516,423 A | * 5/1996 | Conoby et al. | 210/85 |
| 5,589,077 A | 12/1996 | Matsuda et al. | 210/741 |
| 6,406,623 B2 | * 6/2002 | Peterson et al. | 210/195.2 |

FOREIGN PATENT DOCUMENTS

| | | |
|---|---|---|
| DE | 898 995 | 12/1953 |
| DE | 24 32 431 | 1/1976 |
| EP | 0 400 285 | 9/1991 |
| GB | 840295 | 7/1960 |
| WO | 93/18848 | 9/1993 |

* cited by examiner

Primary Examiner—Joseph W. Drodge
(74) Attorney, Agent, or Firm—Burns, Doane, Swecker & Mathis, L.L.P.

(57) ABSTRACT

The method relates to bringing about a mixed state of at least two fluids in a second part (34) of a line, which have flowed through a first part (32) of this line. This is attained in that a fractional flow of the fluids is withdrawn from the second part (34) of the line at a point (43), and this fractional flow is resupplied to the second part (34) of the line at a different point (45). A employment to avoid clogs in modules in a crossflow filtration system is described, along with apparatuses for performing the employment.

38 Claims, 14 Drawing Sheets

FILTRATION APPARATUS AND METHODS

This application is a 371 of PCT/CH99/00294, filed on Jul. 02, 1999.

BACKGROUND OF THE INVENTION

The invention relates to a method for bringing about a mixed state of at least two fluids in a second part of a line that have flowed through a first part of this line, to a use of the method in a crossflow filtration system, and to an apparatus for performing the method.

Known crossflow filtration systems are embodied as multipass systems, in which a plurality of filtration modules are disposed in a plurality of filtration routes that are supplied in parallel. Such filtration routes are known as passes. These passes are fed in parallel with the fluids to be filtered from a distributor line. Each filtration module in turn includes a number of membrane tubules that carry filtration membranes and are subjected in parallel to the fluids to be filtered.

FIG. 1 shows a diagram of one such known crossflow filtration system. It includes nine passes 1. Each of which has four filtration modules 2. In each pass 1, the filtration modules 2 are connected in series with one another. The nine passes are supplied in parallel with fluids to be filtered through a distributor line 3. In the filtration modules 2, a fraction of the fluids is separated out in the form of permeate or filtrate, while the remaining fraction of the fluids is collected as retentate by a collecting line 4 and removed. The removal of the permeate is not shown here.

FIG. 1 shows two fluids 5 and 6 in the distributor line 3, with a parting boundary 7 between them. The fluids 5 and 6 occur when the retentate 6, after the conclusion of a filtration cycle, is positively displaced out of the filtration system by means of water. In the state shown, some of the filtration modules 2 and part of the collecting line 4 are already filled with water 5 as a consequence of the positive displacement, while others of the modules 2 and another part of the line 4 are still filled with retentate 6. Under these circumstances, it is known that individual membrane tubules or entire filtration modules 2 repeatedly become clogged, because the high-viscosity retentate 6 is no longer positively displaced out of the remaining modules 2 if the water 5, which has low viscosity, can flow out through some of the modules that have already been rinsed out.

If the pressure drop through the filtration modules 2 between the inlet 8 of the distributor line 3 and the outlet 9 of the collecting line 4 was still 5 bar, for example, before the water 5 was supplied, then in the state shown in FIG. 1, after rinsing out of the first pass 1, the pressure drop is reduced to approximately 3 bar, and it drops further as further passes 1 are rinsed out. The reduced pressure drop slows down the flow speed in the modules 2 that are still filled with retentate 6. A structural effect increases the high viscosity of the retentate 6 still further, until the flow comes to a stop. The remaining pressure drop of less than 3 bar is then no longer sufficient to positively displace the remaining retentate 6.

Known apparatuses have abated this problem by means of symmetrical distributors and/or very slowly opening water valves while the retentate supply is still open. In the first case, the parting boundary 7 reaches all the passes 1 at the same time, while in the second case the difference in viscosity of the fluid mixtures reaching the passes 1 at the same time is decreased.

Known symmetrical distributors are designed for only a maximum of four passes, for reasons of space and expense, and are usually combined with static mixers. Water valves that open slowly require regulating devices to allow them to reach a sufficiently slow reduction in the viscosity of the retentate. Idle flow zones that nevertheless remain can still cause clogging in this case, however.

Experience shows that despite the known provisions described, clogging of modules cannot be avoided. The situation is especially problematic in filtration systems with distributors for up to two hundred membrane tubes, which is equivalent to a standard industrial-scale system with ten passes.

SUMMARY OF THE INVENTION

It is therefore the object of the invention to bring about a mixed state of at least two fluids in a line that makes it possible for module clogging of the kind described to be effectively prevented.

According to the invention, in a method of the kind referred to at the outset, this object is attained in that at at least one point of the second part of the line, at least a fractional flow is withdrawn from the line, and that this fractional flow is returned to the second part of the line again after a time lag. The method is preferably embodied such that the fractional flow is returned to the second part of the line at the same point where it was withdrawn or at a point located upstream thereof.

As an apparatus for mixing fluids in a line, at least one side line is preferably used, which connects at least two points of the line, which are spaced apart from one another in the direction of the line, to one another and recirculates a fractional flow from the downstream line point to at least one of the upstream line points.

A use of the method of claim 1 for avoiding clogs in modules in a crossflow filtration system, in which at least two filtration routes (passes) that include modules are supplied in parallel with the fluids to be filtered from a distributor line, is distinguished in that the second part of the line is used as the distributor line for the passes.

Further variants of the method as well as its use and the apparatus for performing it are defined by the claims.

BRIEF DESCRIPTION OF THE DRAWINGS

Exemplary embodiments of the invention are described in further detail in the ensuing description and shown in the drawing figures. Shown are.

DETAILED DESCRIPTION OF THE INVENTION

Figure 2:
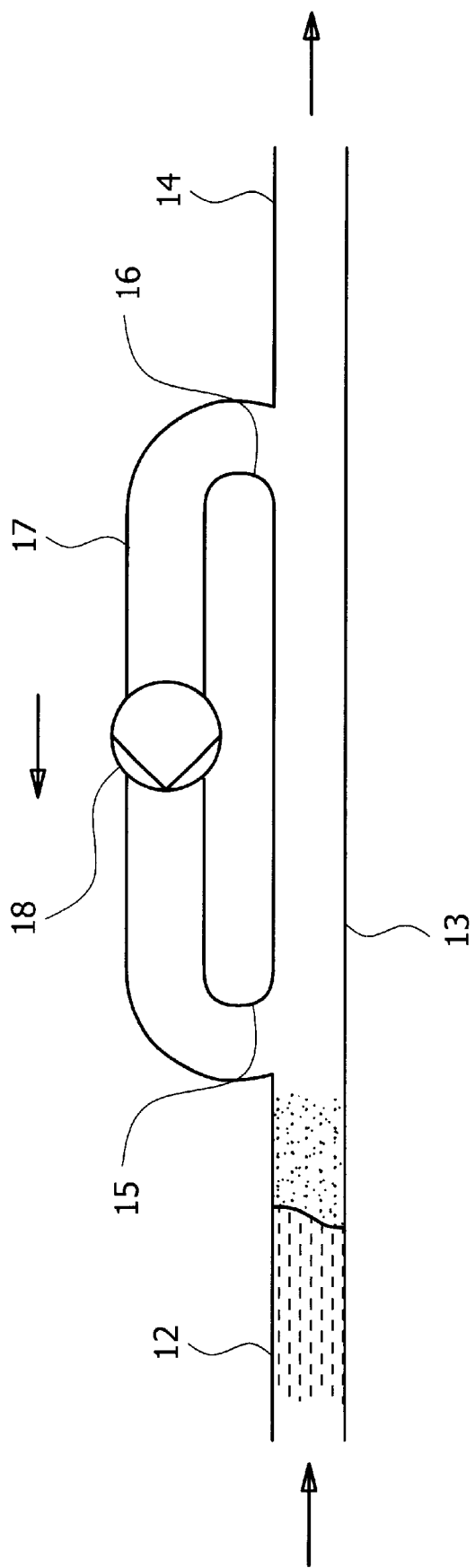
FIG. 2, an apparatus according to the invention for mixing fluids in a line.

FIG. 2 shows an apparatus according to the invention for mixing fluids in a line 13. The fluids are supplied unmixed to the line 13 via a line 12 and are removed, mixed, from the line 13 via a line 14. Two points 15, 16 in the line 13, spaced apart from one another longitudinally, communicate with one another through a side line 17. By means of a pump 18 in the side line 17, a fractional flow from the downstream point 16 of the line is recirculated in a loop to the upstream point 15 of the line.

The mixing effect ensues in the apparatus of FIG. 2 when a plurality of fluids are located side by side in a cross section of the line 12. This effect also occurs, however, especially when a plurality of fluids succeed one another longitudinally in the line 12. Because of the recirculation of a fractional flow through the side line 17, a first fluid is mixed into a second fluid, the latter following a parting boundary, until such time as the second fluid has positively displaced the first fluid entirely out of the side line 17. The concentration of the second fluid upstream of the parting boundary will accordingly rise only slowly over a length that depends on the spacing of the line points 15, 16. Only within this length is the mixing attained with the apparatus of FIG. 2.

Figure 3A:
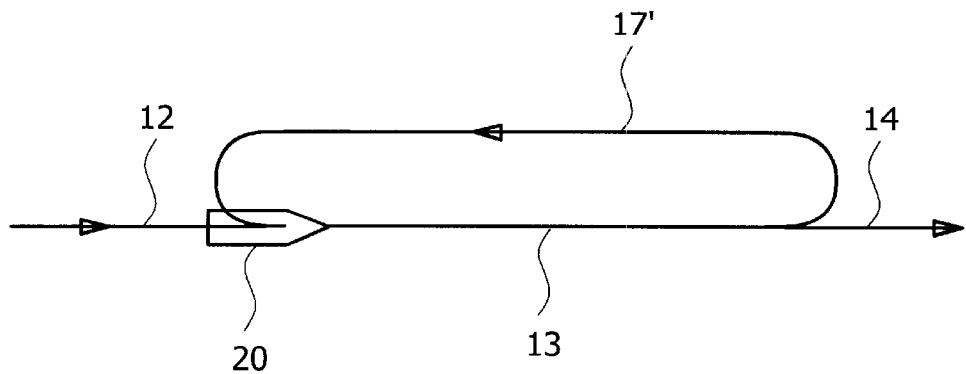
FIG. 3a, a variant of the apparatus of FIG. 2 having an injector.

In FIG. 3a, which shows a variant of the apparatus of FIG. 2, the reference numerals from FIG. 2 designate equivalent components. Instead of the pump 18, in FIG. 3a at the upstream line point an injector 20 is provided. The injector directs a flow from its end to drive the surrounding fluid in the same direction and thereby aspirate or draw the fractional flow from the downstream line point into the upstream line point via the side line 17'. Various designs of such injectors are known per se, for example having a guide baffle, or in the form of a slotted injector.

Figure 3B:
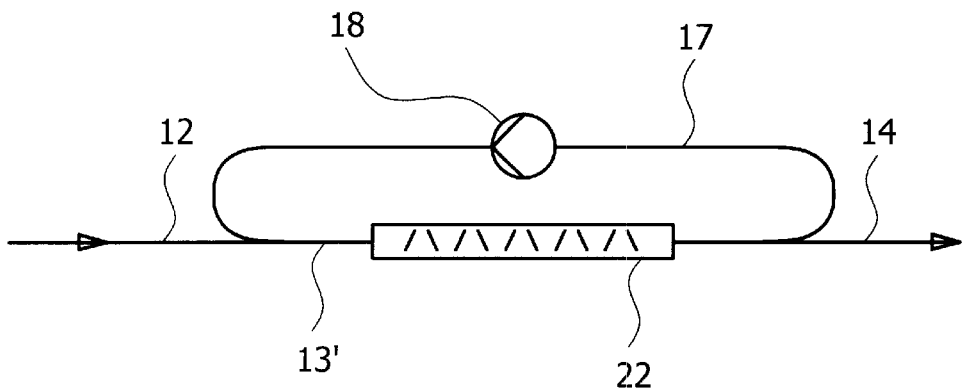
FIG. 3b, a variant of the apparatus of FIG. 2 having a radial mixer.

In FIG. 3b, which shows an apparatus corresponding to FIG. 2, a radial mixer 22 is also inserted into the line 13' for mixing purposes. The radial mixer 22 improves the mixing of the fractional flow from the side line 17 transversely to the axis of the line 13'.

Figure 3C:
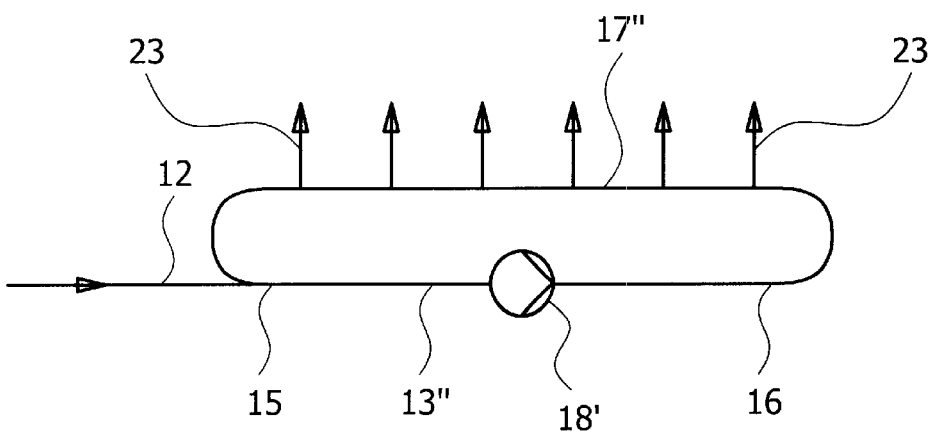
FIG. 3c, a variant of the apparatus of FIG. 2, having a line for distributing the mixed fluids.

FIG. 3c shows a variant of the apparatus of FIG. 2, in which the upstream point 15 of the line 13" for mixing is supplied with a fractional flow via a side line 17''', which at the same time has six fractional outlets 23 for removing the mixed fluids. Accordingly, the line 14 for removal purposes of FIG. 2 is missing here, and as the fractional flow, the side line 17" is supplied with the entire line flow reaching the downstream line point 16. In the variant of FIG. 3c, a recirculating pump 18' is also inserted into the line 13" for the sake of effective recirculation of the line flow via the side line 17".

Figure 3D:
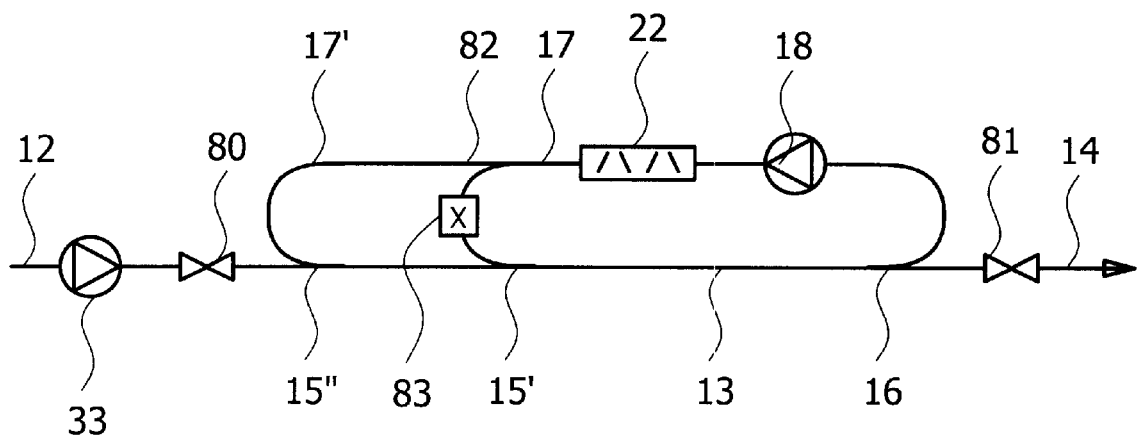
FIG. 3d, a variant of the apparatus of FIG. 2, in which a fractional flow from a line is resupplied to two points of the line.

In the variant of the apparatus of FIG. 2 schematically shown in FIG. 3d, it is made possible, by means of a mode of operation that is independent of the delivery of fluids via the line 12, to proceed directly to a mixed state from a first fluid in the removal line 14 without a gradual transition. This is attained in that a fractional flow from the downstream line point 16 is supplied, via a first side line 17, to a first upstream line point 15' and, via a second side line 17', to a second upstream line point 15". As soon as a parting boundary between two fluids from the line 12 has moved into the region between the line points 15" and 16, the following process sequence occurs with this premixer:

- two valves 80 and 81 upstream of the inlet and downstream of the outlet of the mixing line 13 are closed;
- the recirculating pump 18 in the side line 17 is turned on;
- by means of the circulation in the closed loops of the lines 13, 17, 17' with different time lags, mixing occurs along the mixing line 13. At the same time, by means of the radial mixer 22, a transverse mixing occurs as well;
- the valves 80 and 81 are opened;
- a feed pump 33 in the supply line 12 is additionally connected, in order to remove the resultant mixture of fluids via the removal line 14.

A divider 82 between the side lines 17, 17' accordingly divides nonhomogeneities, arriving via line 17, to a distance Δl between the line points 15', 15". Advantageously, the line length b between the divider 82 and the line point 15' via 17', 15" is unequal to the line length a between the divider 82 and the line point 15'. Preferably, b=(n+½)a, where n is a natural number. To compensate for the different line lengths a and b, a throttle 83 is provided between the divider 82 and the line point 15'; with this throttle, the flows Qa through the throttle 83 and Qb via the line point 15" are made approximately equal to one another; Qa≈Qb.

Figure 3E:
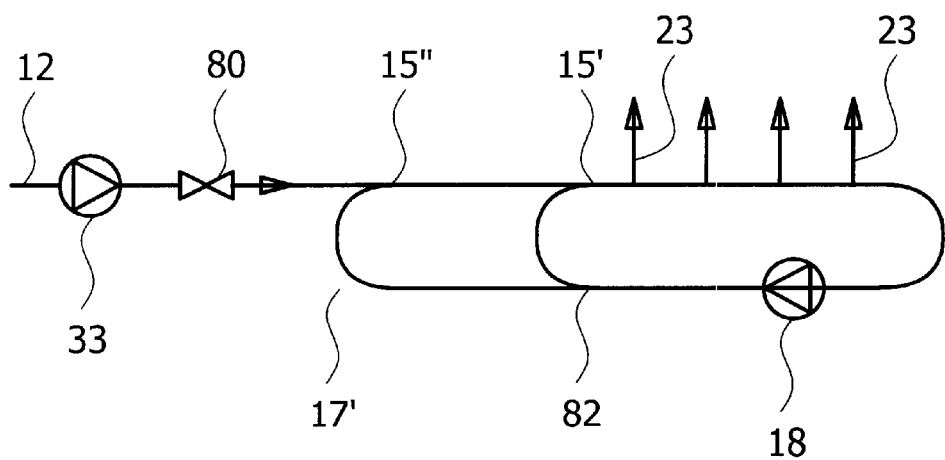
FIG. 3e, a variant of the apparatus of FIG. 3d, having a line for distributing the mixed fluids.

FIG. 3e shows a variant of the apparatus of FIG. 3d, with a line for distributing the mixed fluids by way of four fractional outlets 23. In a first operating mode, as long as the inlet valve 80 is closed, only a flow Q82 flows in the loop via the divider 82 and not via the fractional outlets 23, because of the recirculating pump 18; the apparatus is operative as a pure premixer. In the second operating mode with an open inlet valve 80, the flow Q80 through the inlet valve 80 is preferably adjusted to Q82≈½Q80.

Figure 4:
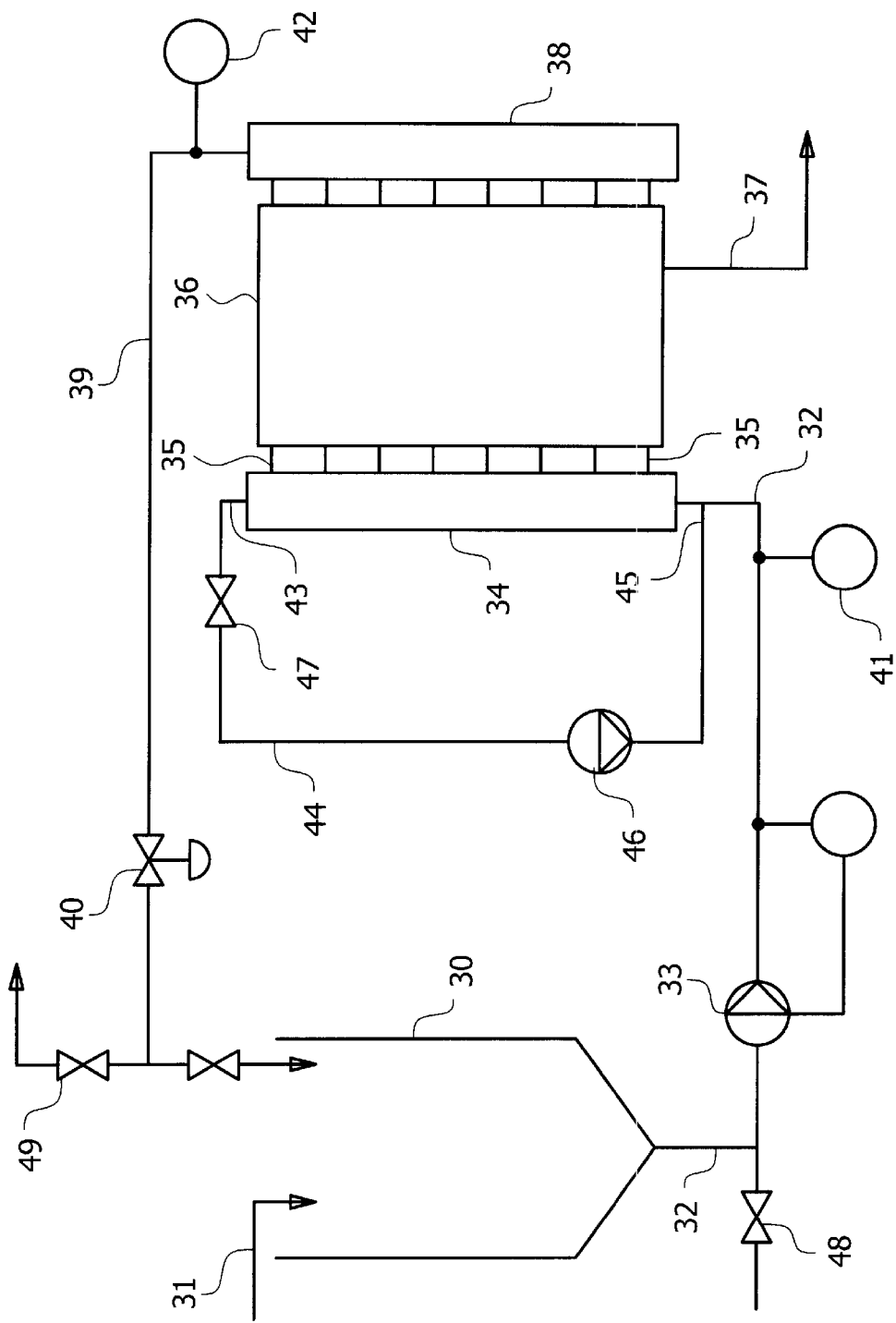
FIG. 4, a diagram of a crossflow filtration system, in which the method of the invention for mixing fluids is employed.

FIG. 4 shows a diagram of a crossflow filtration system in which an apparatus for mixing fluids is employed. In a manner known per se, the system includes a container 30 for a media to be separated, which are supplied via a line 31. Connected at the bottom to one outlet of the container 30 is a feed line 32 for the contents of the container, and a feed pump 33 is incorporated into this feed line. The pump 33 generates an outlet pressure of Δp=6 bar and a feed flow Q1. The feed line 32 is connected to a distributor line 34, which distributes the media to be filtered over parallel filtration routes or passes 35. The passes 35 lead to a collecting line 38, by way of a filter unit 36 that excretes a filtrate or permeate via a line 37.

The collecting line 38 carries a fraction, not excreted via the line 37, oft he media to be filtered back into the container 30 in the form of retentate, via a retentate line 39 and a throttle element 40. With the throttle element 40, the pressure drop between the inlet 45 of the distributor line 34 and the outlet of the collecting line 38 can be adjusted. This pressure drop can be measured by a pressure sensor 41 for the inlet pressure p1 and a pressure sensor 42 for the outlet pressure p2.

A side line 44 is connected to one end 43 of the distributor line 34 and recirculates a fractional flow from the end 43 to the inlet 45 of the distributor line 34. If separate fractions of the media to be filtered reach the inlet 45 of the distributor line 34 in succession via the feed line 32, then they are delivered in a mixed state to the passes 35, and the problems described in conjunction with FIG. 1 do not arise. A second feed pump 46 and a throttle element 47 are incorporated in the side line 44, as FIG. 4 shows. The pump 46 generates an outlet pressure of Δp=0.2 bar and a feed flow which amounts to 50% to 100% of the flow Q1 of the first pump 33.

As a consequence, a flow is obtained in the distributor line 34 that amounts to from 150% to 200% of the flow Q1. As a result, any remaining differences in concentration of the media to be filtered reach all the passes 35 with a slight time lag and can never have an effect for very long at individual passes. Such differences in concentration occur especially whenever, after the conclusion of a filtration cycle, rinsing water for positively displacing high-viscosity retentate residues via an outlet valve 49 is supplied via a valve 48 of the container 30.

Figure 5:
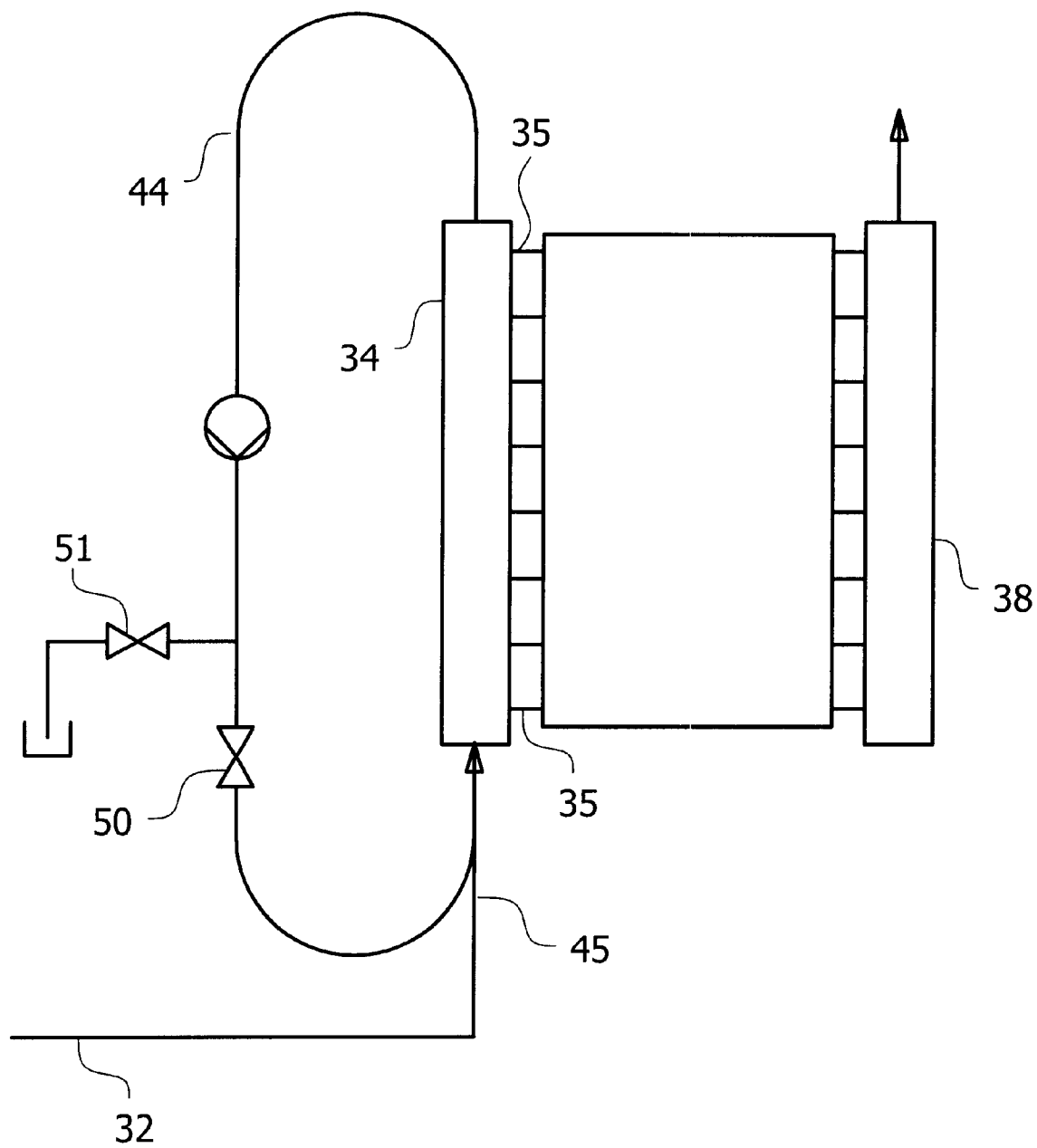
FIG. 5, a variant of the filtration system of FIG. 4, having a device for interrupting a recirculated fractional flow.

FIG. 5 shows a variant of a detail of the filtration system of FIG. 4. FIG. 5 schematically shows the distributor line 34 with the filtration routes (passes) 35, the collecting line 38, and the side line 44. As the device for interrupting the recirculated fractional flow, the side line 44 of FIG. 5 has a blocking valve 50 on its lower end, upstream of the inlet 45 of the distributor line 34, and a drain valve 51 preceding the blocking valve. The valves 50, 51 are used for a final rinsing out of the lines 34, 44 with water or an alkaline lye as a rinsing agent in cleaning. Retentate that according to FIG. 4 has circulated in the retentate loop 30, 32, 34, 36, 38, 39 during one filtration cycle is thus rinsed out.

Figure 6:
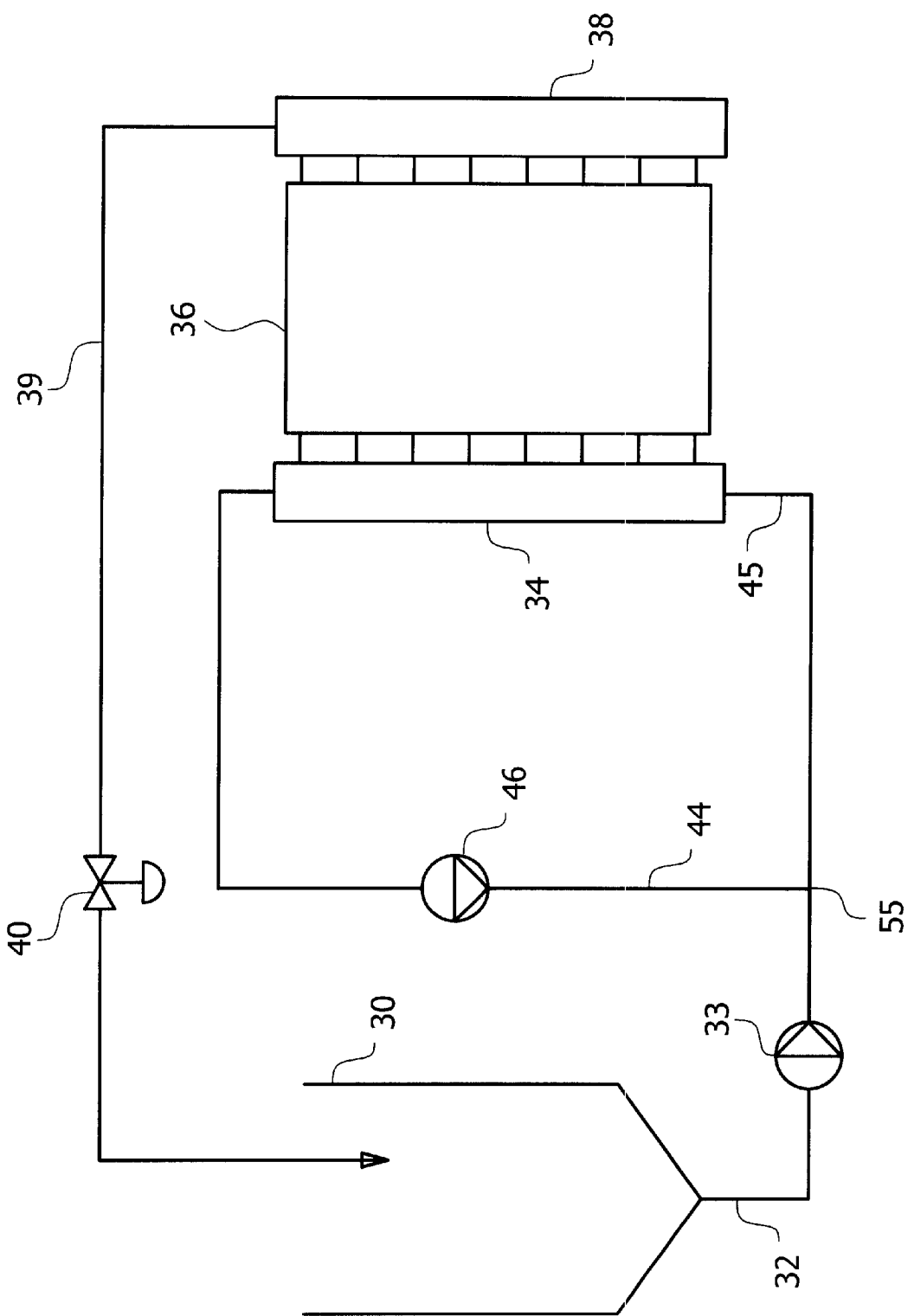
FIG. 6, a variant of the filtration system of FIG. 4, with recirculation downstream of a retentate pump.

FIG. 6 shows a diagram of a variant of the filtration system of FIG. 4. The recirculation of the fractional flow from the distributor line 34 is done here at a point 55 directly downstream (on the pressure side) of the retentate feed pump 33, in contrast to the inlet 45 of the distributor line 34 as in FIG. 4. The advantage of this kind of preliminary circuit resides in better longitudinal mixing in the line between the points 45 and 55, since the distance between these points, in systems embodied for practical use, is relatively long and has a plurality of elbows.

Figure 7:
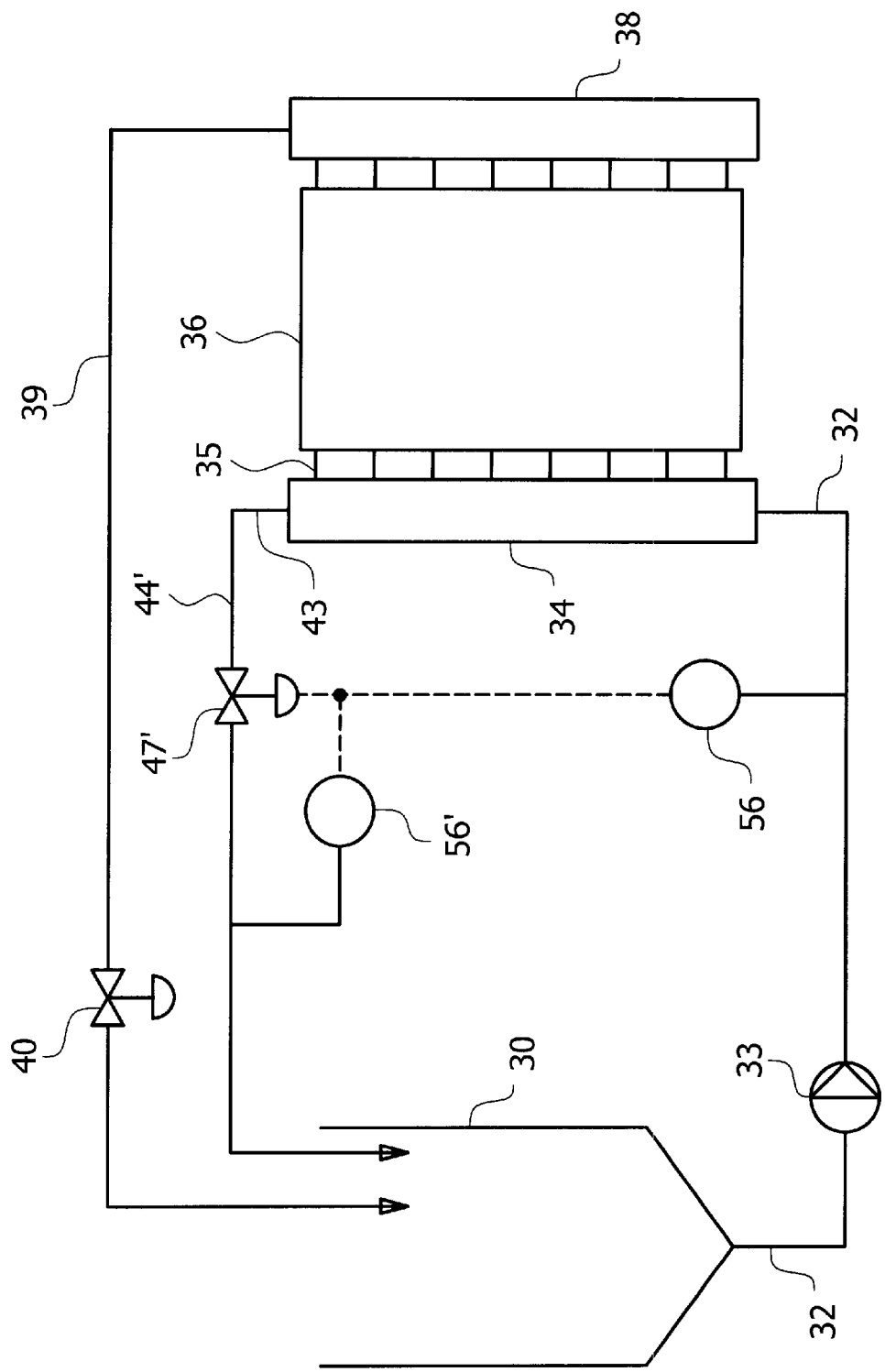
FIG. 7, a variant of the filtration system of FIG. 4, with recirculation via a batch tank.

In a further variant of the filtration system of FIG. 4, FIG. 7 schematically shows a recirculation of the fractional flow from the end 43 of the distributor line 34 via a line 44' and the batch tank 30. This dispenses with the second feed pump 46 of FIG. 4. A throughput regulating valve 47' or a fixedly set baffle is inserted into the line 44' here in such a way that approximately 50% of the retentate flow, supplied via the feed line 32, is returned directly to the batch tank 30. This variant has the advantage of dispensing with the second feed pump 46 of FIG. 4. However, the energy consumption is greater, since approximately 50% of the energy of the feed flow from the line 32, at approximately 6 bar, goes unused for the filtration in the filter unit 36 (FIG. 4). The throughput regulating valve 47' is controlled via two sensors 56, 56' for the throughput.

Figure 8:
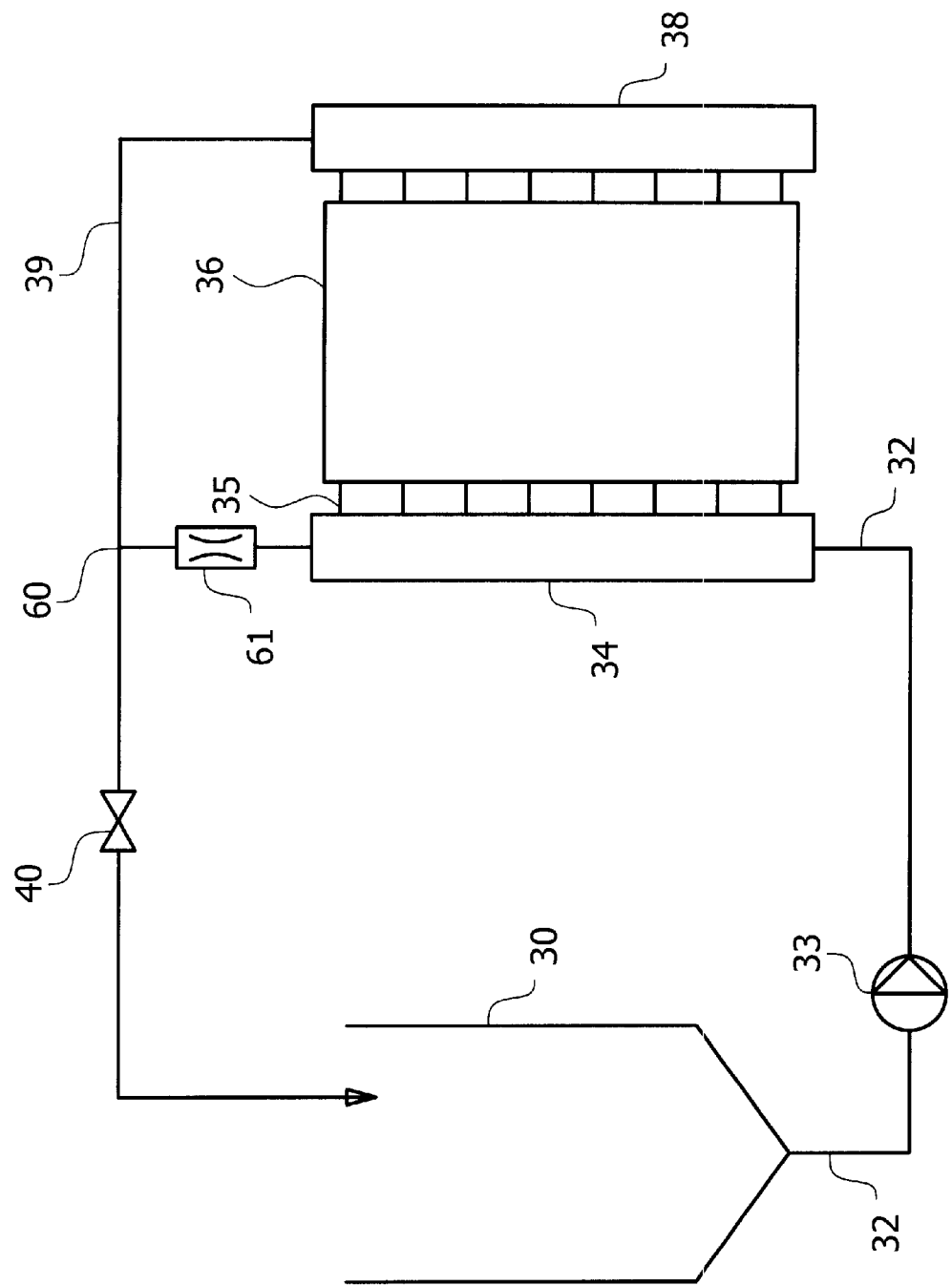
FIG. 8, a variant of the filtration system of FIG. 4, with recirculation via a retentate line.

FIG. 8 shows a variant of the filtration system of FIG. 4 that again functions without the second feed pump 46 of FIG. 4. The recirculation of the media to be filtered from the distributor line 34 in this case is done by feeding at a point 60 into the retentate line 39 from the collecting line 38. A throttle 61 for pressure adaptation is also inserted between the distributor line 34 and the point 60. Once again, an additional burden on the feed pump 33 arises from the flow through the throttle 61, which while being somewhat less than in the variant of FIG. 7 is still relatively high.

Figure 9:
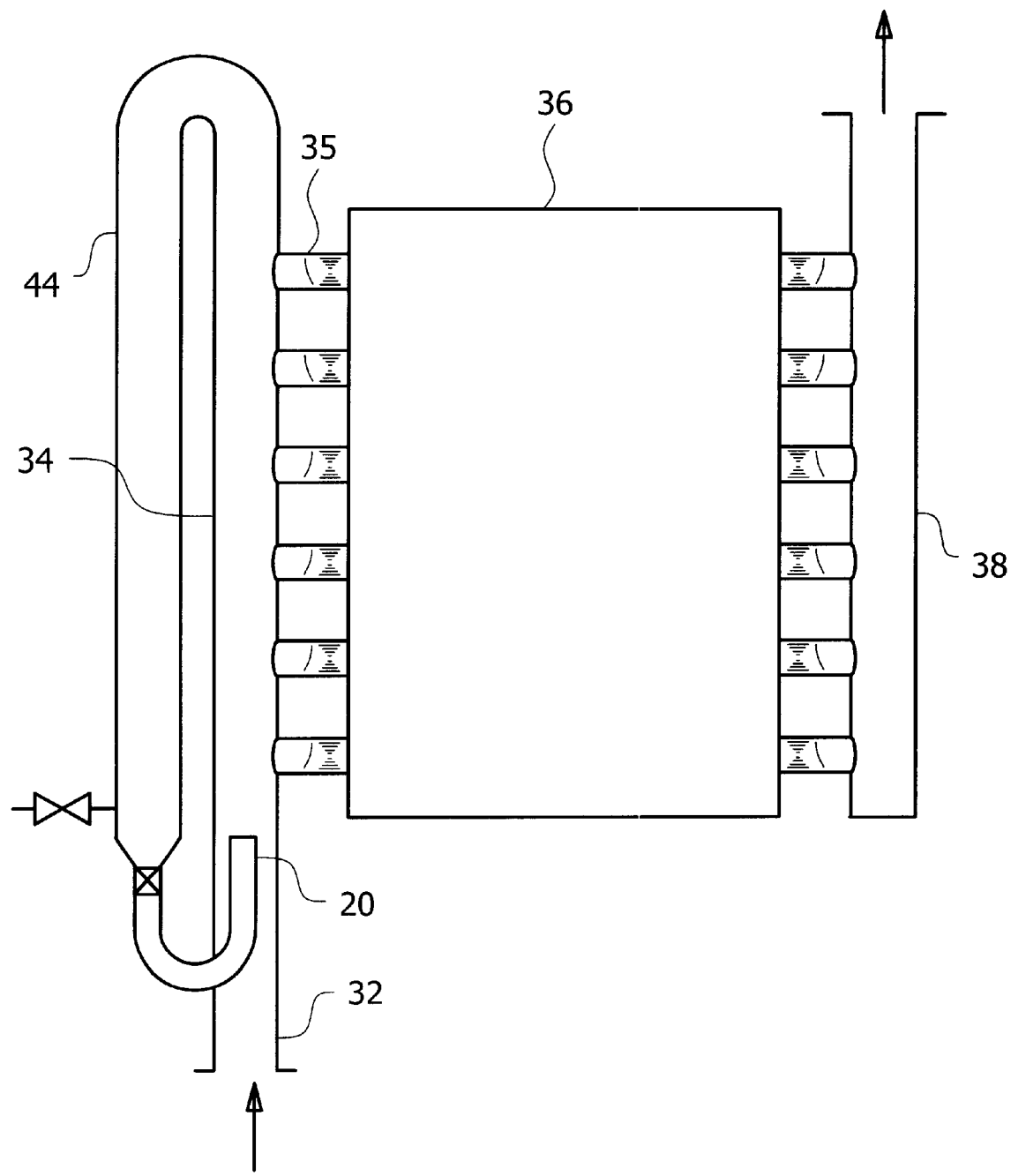
FIG. 9, a detail of a variant of the filtration system of FIG. 4, with recirculation via an injector.

FIG. 9, similarly to FIG. 3a, shows a detail of a variant of the filtration system of FIG. 4, with recirculation via an injector 20. The feed line 32, distributor line 34, side line 44, filtration routes (passes) 35, and collecting line 38 are identified by the same numerals as in FIG. 4. The distributor line 34 and the collecting line 38 are advantageously horizontal, for the sake of uniform distribution of sludge deposits when there are interruptions in production in the system. If only a vertical disposition is possible, then advantageously this is selected to be as shown in FIG. 10.

Figure 10:
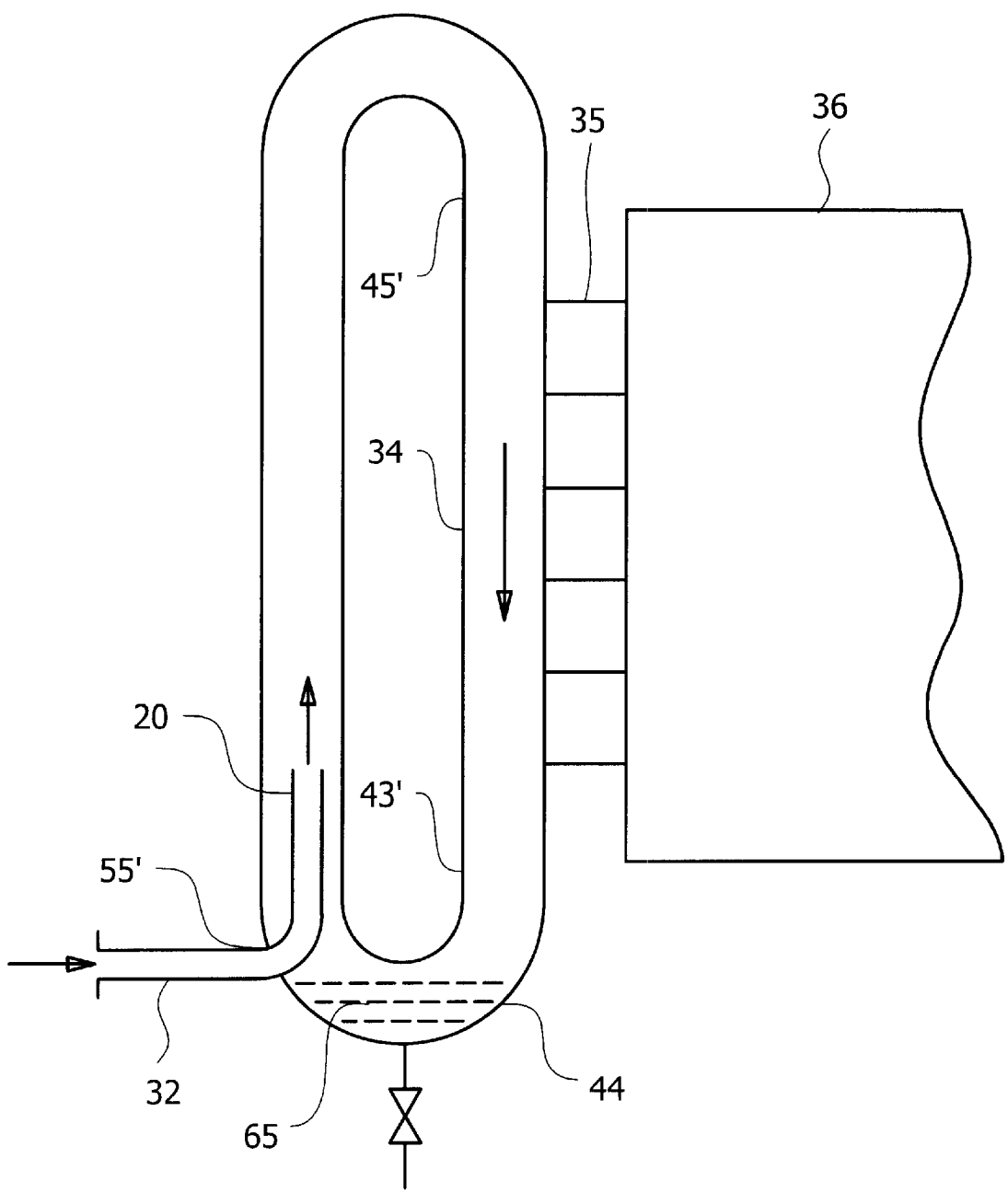
FIG. 10, a detail of another variant of the filtration system of FIG. 4, having a vertically placed distributor and recirculation via an injector.

Still another variant of the filtration system of FIG. 4, of which FIG. 10 shows a detail, employs recirculation via an injector 20. In contrast to the variant of FIG. 4, however, here the point 55' at which the retentate is recirculated by the side line 44 from the end 43' of the distributor line 34 into the feed line 32, is placed as far upstream as possible from the inlet 45' of the line 34. Sludge deposits 65, which can occur in the side line 44 during interruptions in operation of the filtration system, are thus better mixed in again if the side line 44 is located at the bottom and there is a flow from top to bottom through the distributor line 34. The flow toward the passes 35 is also more uniform than in the variant of FIG. 5.

Figure 11:
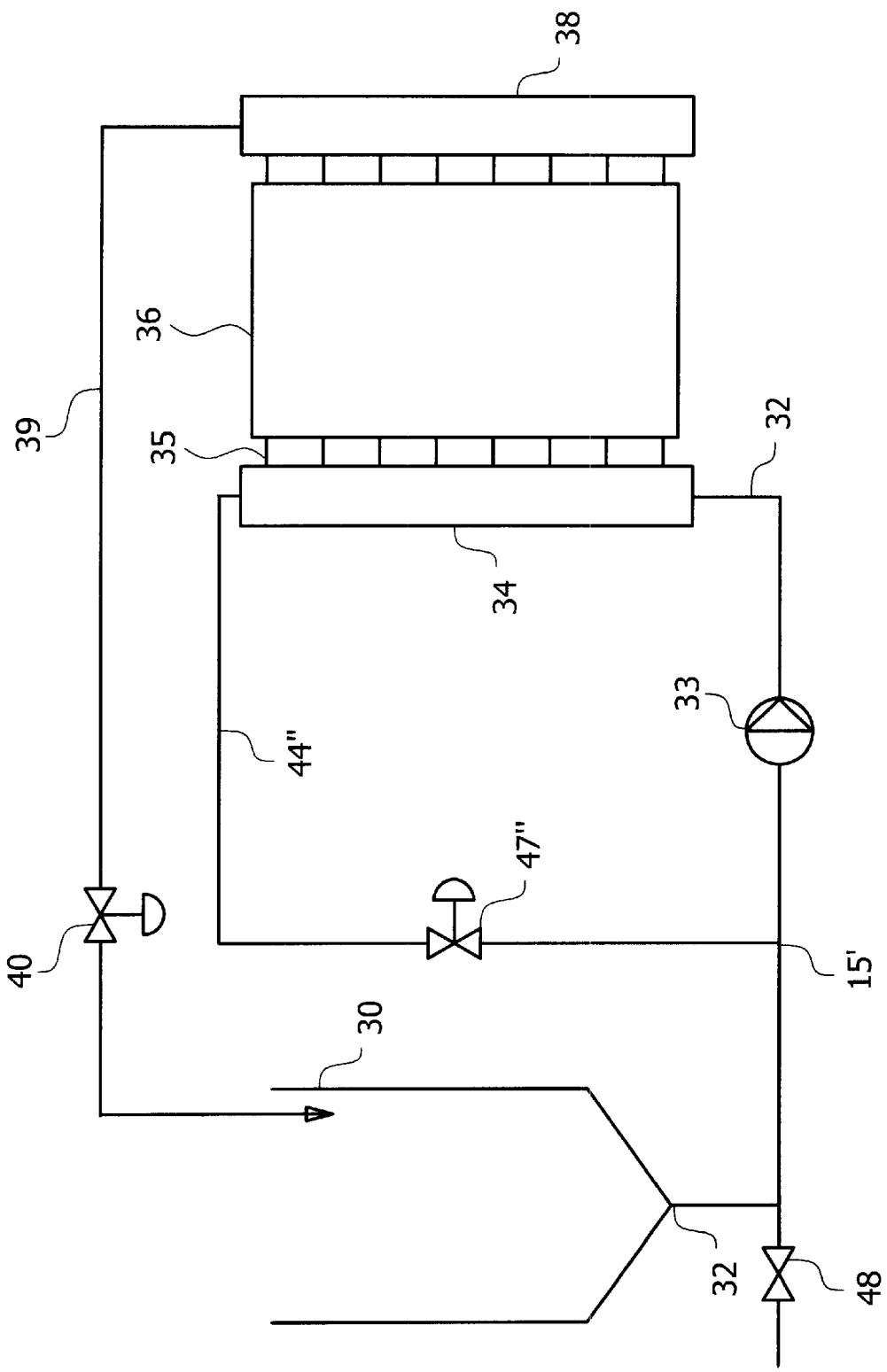
FIG. 11, a variant of the filtration system of FIG. 4, with recirculation upstream of a retentate pump.

A variant of the filtration system of FIG. 4, with a recirculation of a fractional flow of the media to be filtered via a side line 44" into the feed line 32 at a point 15' upstream of retentate pump 33 is schematically shown in FIG. 11. For adaptation of the pressure, a throttle valve 47" is inserted into the side line 44". This variant of the filtration system offers an especially good longitudinal mixing in the event of deposits of solids, such as activated charcoal, bentonite, and so forth, after interruptions in operation.

Figure 12:
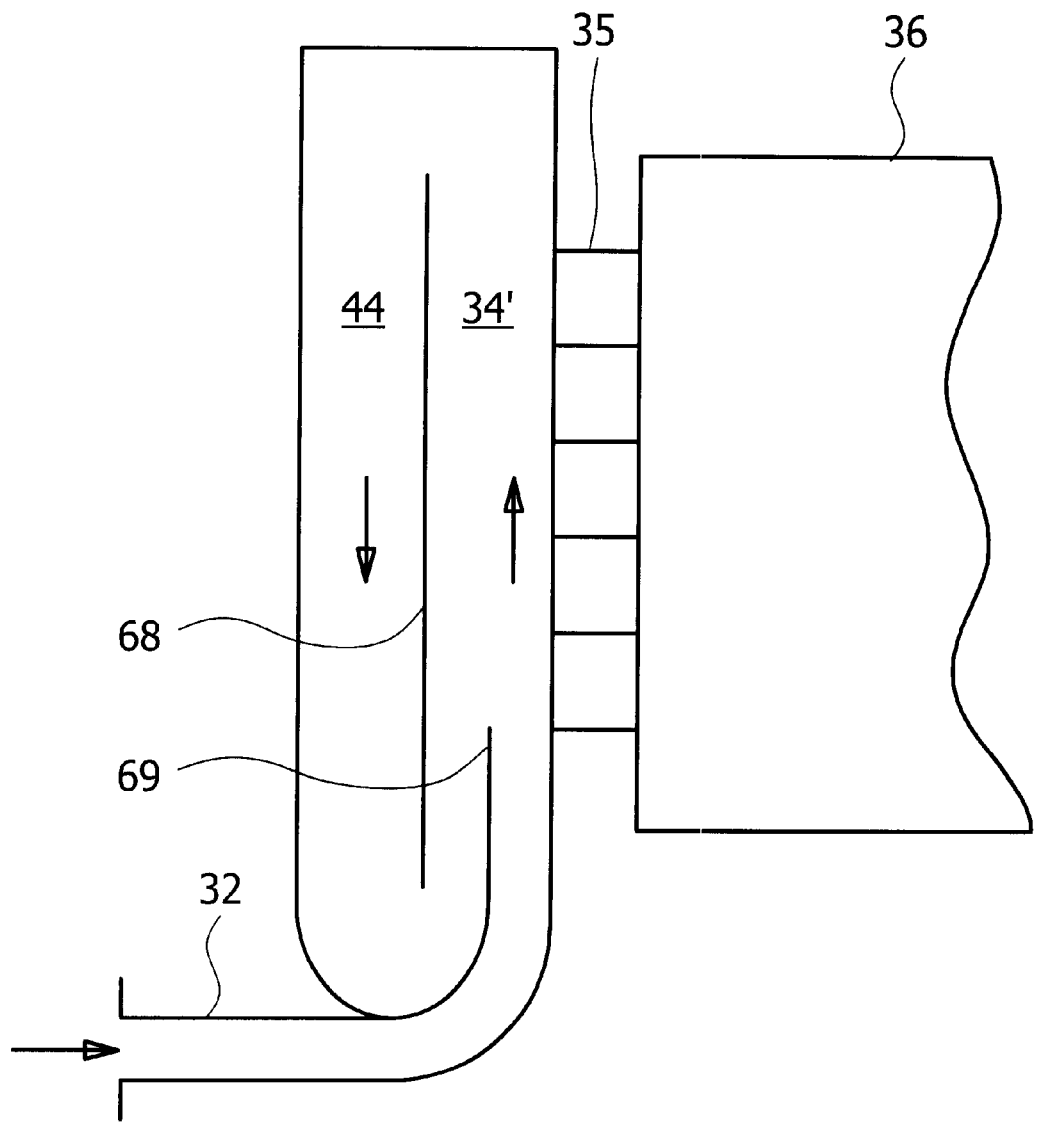
FIG. 12, a detail of a variant of the filtration system of FIG. 4, having a side line and a distributor line integrated in one component.
Figure 12:
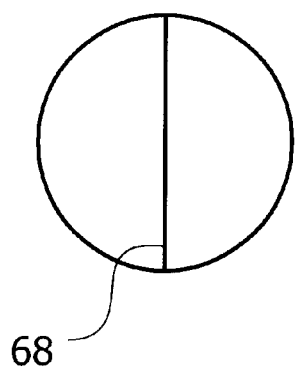
Figure 12:
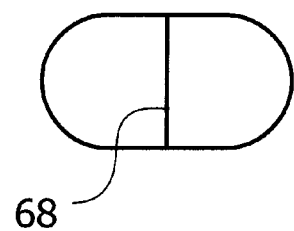

FIG. 12 shows a detail of a variant of the filtration system of FIG. 4, with a side line 44 and distributor line 34' integrated in one component. These lines 44, 34' can be made by incorporating a partition 68 into a line of circular, oval or rectangular cross section. Thus advantageously one end 69 of the feed line 32 can be designed as an injector, which returns the flow from the side line 44 back to the distributor line 34'.

Figure 13:
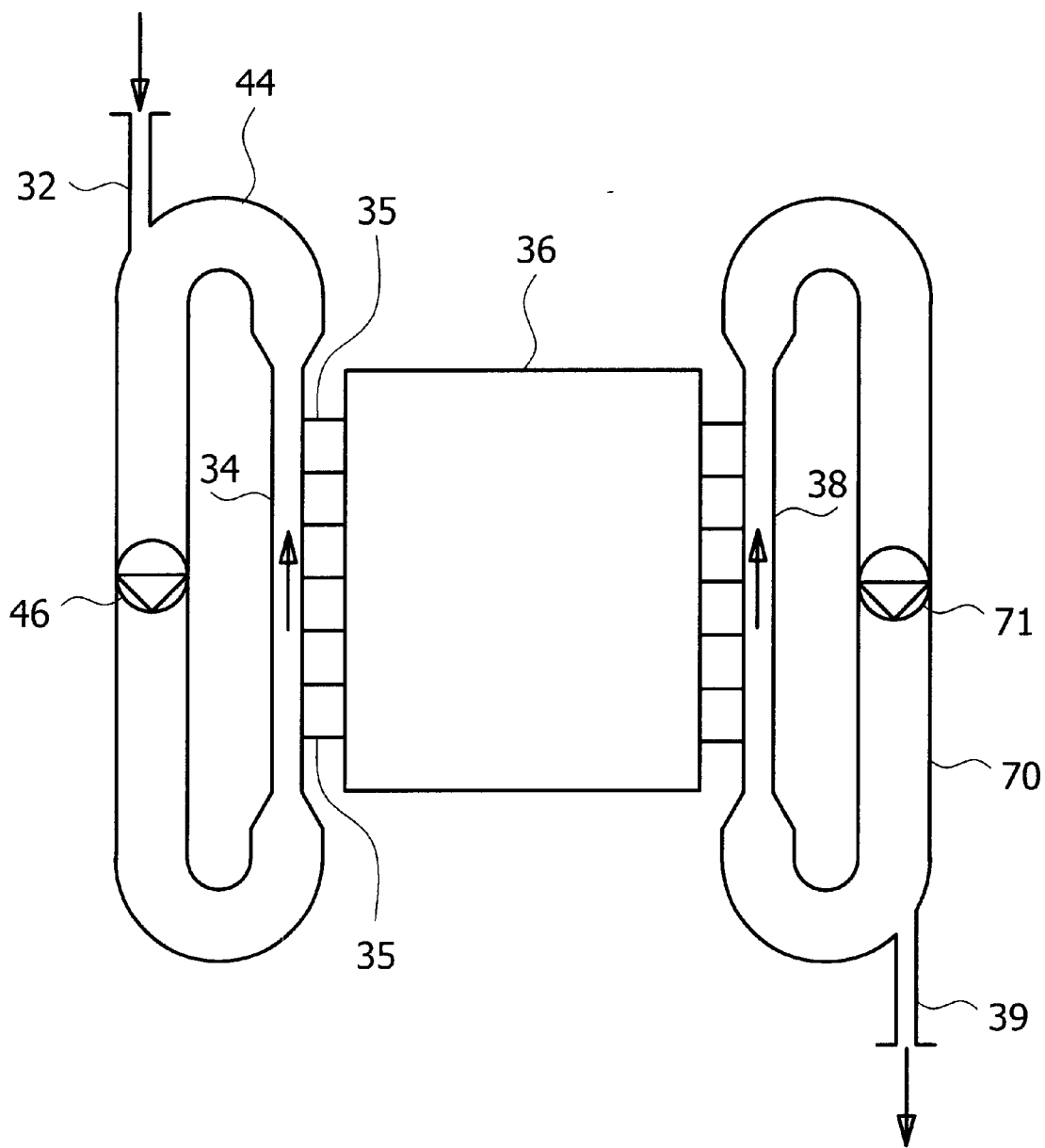
FIG. 13, a detail of a variant of the filtration system of FIG. 4, with one loop each for the distributor line and the collecting line.

A detail of a variant of the filtration system of FIG. 4 for adaptation of the pressure drop via the individual passes 35 is schematically shown in FIG. 13. Here in addition to the preliminary circuit 44, 46 for the distributor line 34, the collecting line 38 is also provided with a subsequent circuit 70. The feed pump 46 in the preliminary circuit and a feed pump 71 in the subsequent circuit assure that in both loops, as shown in FIG. 13, the passes located at the bottom are reached first by the flows, and the passes located at the top are reached last. By dimensioning the feed pumps 46, 71 and the lines 34, 44, 38, 70 appropriately, it is attained that the pressure drop Δp over each individual one of the passes 35 is equal and approximately constant. In addition, the cross sections of the lines 34, 38 are reduced inside each loop, as FIG. 13 shows, so that nonhomogeneities of the media to be filtered reach the individual passes with the least possible time lag, because of the greater flow speeds.

For one skilled in the art, many variants in the use of the method and the apparatus for mixing fluids in a line will suggest themselves, none of them departing from the scope of the appended claims. The apparatuses are suitable for all areas of crossflow filtration and all types of membrane, such as hollow fibers, capillaries, wrapped modules, tube modules, and organic and inorganic membranes in RO, NF, UF, MF, and screen filtration. The fluids to be mixed include inorganic and organic products to be separated, with or without solid components. Filtration systems that include these apparatuses can operate discontinuously or continuously.

The distributor lines 34—see FIG. 4—are advantageously arranged horizontally or vertically, depending on the type of products. Operating the preliminary circuits 44, 46 for recirculating the fractional flows during the entire running time of the systems provides increased reliability in the event of fluctuations in viscosity of the products. Operation only immediately before and during a positive displacement of product out of the system leads to an energy savings, although relatively slight. Instead of the modular passes 35 described in conjunction with FIG. 4, individual membrane tubes are also suitable for these filtration routes; their number can be equivalent to the number of passes, up to approximately two hundred.

Figure 1:
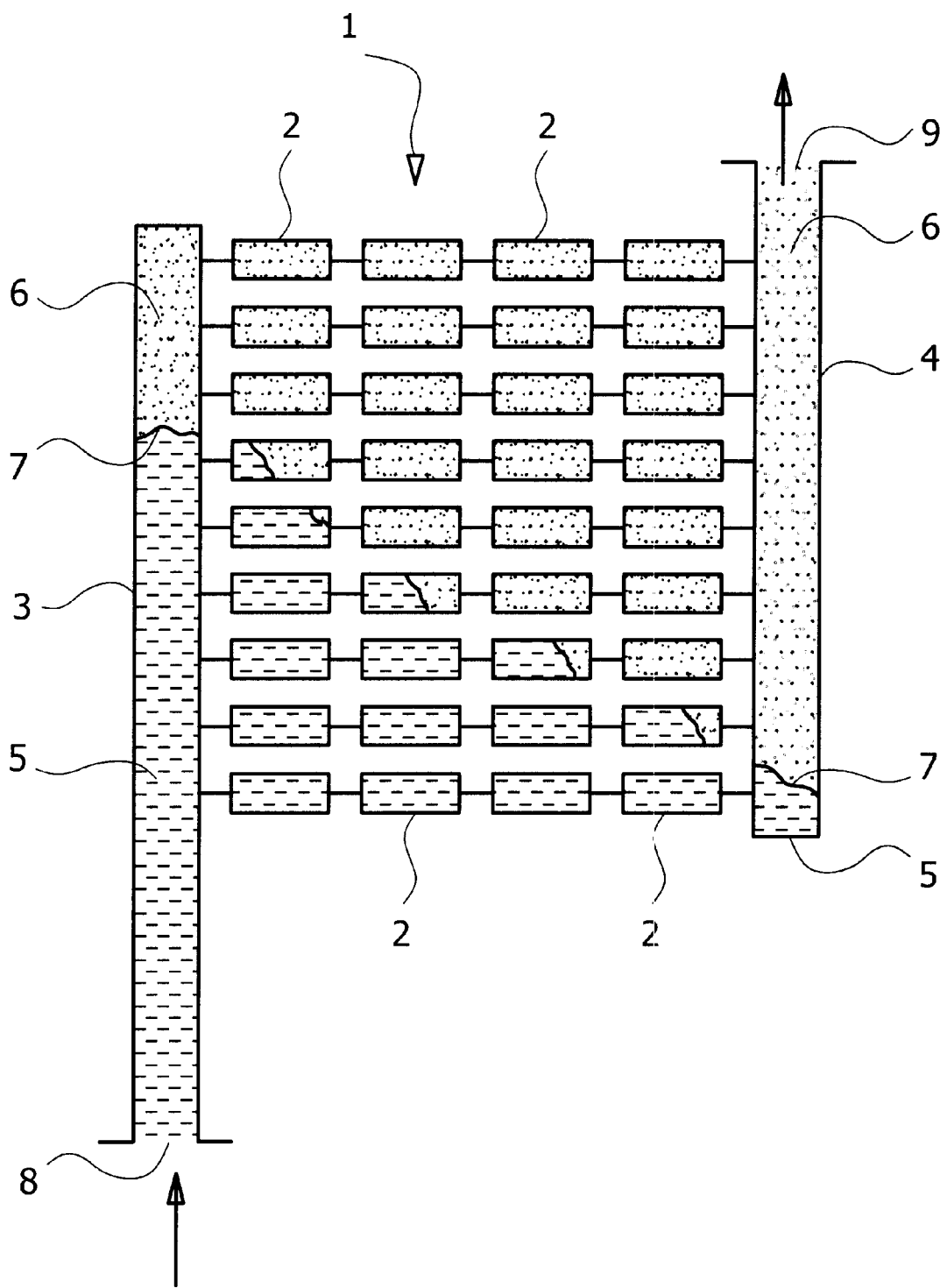
FIG. 1, a diagram of a known crossflow filtration system.

While conventional filtration modules of the type described in conjunction with FIG. 1 include approximately twenty filtration tubes, industrial-scale modules with up to about two hundred membrane tubes are also already known. Often, a system includes only one such industrial-scale module, with which the collecting and distributor lines can then be integrated along with the preliminary circuit, to form an expanded modular unit in accordance with FIG. 4.

What is claimed is:

1. A method for avoiding clogging of filtration routes in a filtration system having at least two filtration routes (35) that include filtration elements and are supplied in parallel with the fluids to be filtered from a distributor line (34) for the filtration routes (35), said method comprising bringing about a mixed state of at least two fluids in a second part (13, 34) of a line, which second part includes said distributor line, after such fluids have flowed through a first part (12, 32) of the line by withdrawing, at at least one point (16, 43) of the second part of the line, at least a fractional flow, and returning at least part of such withdrawn flow to the second part of the line after a time lag.

2. A method according to claim 1, characterized in that after a redilution of the retentate of the filtration system, the fractional flow is interrupted before its return into the distributor line (34).

3. A method according to claim 2, characterized in that following the interruption of the fractional flow, the remainder of the retentate in the distributor line (34) and in the fractional flow is expelled via a drain valve (51).

4. A method according to claim 1, characterized in that the distributor line is supplied with an increased quantity of fluids compared with the quantity required by the filtration routes, and the distributor line is used as a once-through distributor.

5. A method according to claim 4, characterized in that the quantity of fluids supplied to the distributor line amounts to at least 1.1 times the quantity removed via the filtration routes.

6. Crossflow filtration apparatus comprising means for mixing fluids in a supply line that includes a distributor line (34) which distributes the fluids to be filtered to at least two filtration routes (35) in parallel, each of which filtration routes includes at least one filtration element, and a side line (44) which connects to one another a downstream supply line point (43) and at least one upstream supply line point (45) in a loop for recirculation of at least a fractional flow from said supply line, said downstream line point (43) for supplying the side line (44) being located downstream of the last filtration route connection to said distributor line, and said at least one upstream line point (45) being located upstream of the first filtration route connection to said distributor line (34).

7. The apparatus according to claim 6, characterized in that the upstream line point (55) is located downstream of a retentate pump (33) in said supply line for the fluids to be filtered in the crossflow filtration apparatus.

8. The apparatus according to claim 7, characterized in that the side line includes a feed pump (46) between the downstream and the upstream line points.

9. A method for operating the apparatus according to claim 8, characterized in that after a shutdown of the crossflow filtration apparatus, the circulation through the side line (44) is started first with the feed pump (46), and after a time lag, the supply of fluids to be filtered is started with the retentate pump (33).

10. The apparatus according to claim 7, characterized in that the loop for recirculating the fractional flow has at least one valve (50) for interrupting the circulation and for rinsing out lines.

11. The apparatus according to claim 6, characterized in that the loop for recirculating the fractional flow includes the downstream line point (43), the side line (44'), a batch tank (30), and a retentate pump (33) of the crossflow filtration apparatus, as well as the upstream line point.

12. The apparatus according to claim 11, characterized in that the loop for recirculating the fractional flow, downstream of the downstream line point, includes a throttle element (61), and downstream of it discharges into a return line (39), which recirculates retentate from the filtration routes of the crossflow filtration apparatus into the batch tank (30).

13. The apparatus according to claim 11, characterized in that the loop for recirculating the fractional flow in the side line (44') includes a throttle element (47') between the downstream line point (43') and the batch tank (30).

14. The apparatus according to claim 13, characterized in that the throttle element (47') is a regulating valve, which determines the feed flow as a function of the feed flow of the retentate pump (33).

15. The apparatus according to claim 6, characterized in that the upstream line point includes an injector (20), which aspirates the fractional flow from the downstream line point into the upstream line point via the side line (44).

16. The apparatus according to claim 15, characterized in that the distributor line (34), downstream of the upstream line point (55'), includes only a portion of the mixing line such that in the loop for the recirculation, the upstream line point (55') is located closer to the last filtration route than to the first filtration route.

17. The apparatus according to claim 15, characterized in that the distributor line has only a single diameter which is constant throughout.

18. The apparatus according to claim 6, characterized in that the upstream line point (15') is located upstream of a retentate pump (33) in a supply line (32) for the fluids to be filtered in the crossflow filtration apparatus.

19. The apparatus according to claim 6, characterized in that the side line (44) is integrated with the distributor line (34') in a component which additionally has elements (69) for generating a closed-loop circulatory flow for recirculating the fractional flow.

20. The apparatus according to claim 6, characterized in that in addition to the first loop (34, 46) for the fractional flow through the distributor line (34) for the filtration passes (35), a collecting line (38) for the retentate from the filtration passes (35), with a second loop (70, 71) connected to it, is provided.

21. The apparatus according to claim 20, characterized in that the flow directions and dimensions in the first loop (34, 46) and the second loop (38, 70, 71) result in flows in the same direction and substantially the same speeds from the first to the last filtration pass (35) in the distributor line (34) and in the collecting line (38).

22. The apparatus according to claim 21, characterized by regulating devices for the first and second loops, which regulate said speeds as a function of the throughputs of the fluids in the loops as measurement variables.

23. The apparatus according to claim 21, characterized by regulating devices for the first and second loops, which regulate said speeds as a function of the pressure drop of the fluids in the distributor line and in the collecting line as measurement variables.

24. A method of reducing fluid viscosity variations along the length of a distributor extending across the inlet ends of a plurality of filtration routes in a crossflow filtration system to supply fluid to said filtration routes, said method comprising introducing fluid to be filtered into an entrance end of the distributor, withdrawing from said distributor at a location beyond said inlet ends fluid that has not entered said inlet ends of said filtration routes, and mixing the withdrawn fluid with the fluid flowing toward said inlet ends of said filtration routes.

25. In a crossflow filtration system having a retentate tank, a plurality of filtration routes each including at least one filtration element for separating permeate from the retentate, a flow line extending from said tank to said filtration routes and having a pump therein for moving retentate toward said filtration routes, a retentate return line from said filtration routes to said tank, and a rinse fluid line selectively connected to said flow line upstream of said pump for selectively supplying rinse fluid at intervals to rinse out the system, the improvement which comprises means for reducing nonuniformities in the fluid delivered to said filtration routes, said means including: a recirculation loop located between said pump and said filtration routes and being connected to said flow line at upstream and downstream locations spaced apart from one another; and means for flowing fluid from said flow line through said recirculation loop from said downstream location to said upstream location.

26. A crossflow filtration system according to claim 25, wherein said means for flowing fluid comprises a pump.

27. A crossflow filtration system according to claim 25, wherein said means for flowing fluid comprises an injector in said flow line at said upstream location.

28. A crossflow filtration system according to claim 25, wherein said means for reducing nonuniformities additionally includes a radial mixer in said flow line downstream of said upstream location.

29. A crossflow filtration system according to claim 25, additionally including a radial mixer in said recirculation loop.

30. A crossflow filtration system comprising
a tank,
a pump for receiving retentate from said tank and for discharging pressurized retentate to a discharge line,
a flow loop that includes a distributor portion and a supply portion for said distributor portion, said supply portion receiving, at a location spaced from said distributor portion, an end of said discharge line from said pump for injection from said line of pressurized retentate into said supply portion to flow along said supply portion toward said distributor portion, said end of said discharge line being of smaller cross section than said supply portion of said flow loop and retentate in said flow loop being circulated around said loop by the flow from said end of said discharge line, and
a plurality of filtration routes having inlet end portions disposed at locations along the length of said distributor portion of said flow loop and being connected to receive in parallel from said flow loop parts of the retentate flowing along said distributor portion, said filtration routes having therein filtration elements for separating permeate from said retentate and having outlet ends for discharging concentrated retentate from which the permeate has been removed.

31. In a crossflow filtration system for carrying out filtration of fluid in a plurality of filtration routes that include crossflow filtration elements therein, the improvement which comprises:
a distributor for receiving fluid to be filtered upstream of said plurality of filtration routes and distributing such fluid in parallel to inlet ends of said plurality of filtration routes; and
a recycle loop for receiving from said distributor at a location downstream of said inlet ends of said filtration routes a fraction of the fluid to filtered and reintroducing said fraction to said distributor at a location upstream of the inlet ends of said filtration routes.

32. In the operation of a cross-flow filtration system having a retentate flow loop including a tank, a pump, plural filtration routes connected in parallel to receive flow from said pump and in each of which permeate is separated from the retentate, and means for returning retentate from said filtration routes to said tank; an improved method for displacing thickened retentate from said system by a liquid of lower viscosity than such thickened retentate, said method comprising
introducing a stream of said liquid of lower viscosity into said flow loop upstream of said filtration routes, and
mixing lower viscosity liquid with the retentate flowing in a portion of said flow loop toward said filtration routes by circulating a fraction of the flow in said flow loop through a side loop which receives fluid from the flow loop and returns such fluid to said flow loop after a time lag.

33. In a crossflow filtration system having a batch tank for retentate, filtration means for separating permeate from the retentate, a flow line leading from said batch tank to said filtration means and having therein a pump downstream of said batch tank, and an inlet line for rinse fluid selectively connected to said flow line upstream of said pump for selectively supplying rinse fluid at intervals to rinse out the system, the improvement which comprises:
means for mixing retentate from a downstream portion of the flow line with rinse fluid in an upstream portion of the flow line, said mixing means being located between said pump and said filtration means and comprising
a recirculation loop communicating with said flow line at upstream and downstream locations spaced apart from one another, and means for flowing fluid from said flow line through said recirculation loop from said downstream location to said upstream location to mix fluid from said recirculation loop with fluid in said flow line in the space between said upstream and downstream locations.

34. In a crossflow filtration system having a retentate tank, a plurality of filtration routes each including at least one filtration element for separating permeate from the retentate, a flow line extending from said tank to said filtration routes and having a pump therein for moving retentate toward said filtration routes, a retentate return line from said filtration routes to said tank, and a rinse fluid line selectively connected to said flow line upstream of said pump for selectively supplying rinse fluid at intervals to rinse out the system, the improvement which comprises means for reducing nonuniformities in the fluid delivered to said filtration routes, said means including: an auxiliary flow path communicating with said flow line between said pump and said filtration routes and being connected to said flow line at a downstream location in said flow line and at at least one upstream location in said flow line; and means for circulating fluid from said flow line through said auxiliary flow path to withdraw part of the fluid from the flow line at said downstream location and return the withdrawn fluid into the flow line at said at least one upstream location to mix with flow line fluid then located at said at least one upstream location.

35. The crossflow filtration system according to claim 34, wherein said means for circulating fluid through said auxiliary flow path comprises a pump disposed in said auxiliary flow path.

36. The crossflow filtration system according to claim 35, additionally comprising a radial mixer in said flow line between said upstream and downstream locations.

37. The crossflow filtration system according to claim 34, wherein said means for circulating fluid comprises an injector.

38. The crossflow filtration system according to claim 37, wherein said injector is disposed in said flow line at said upstream location.

* * * * *